(12) United States Patent
Dewis (10) Patent No.: US 6,810,677 B2
(45) Date of Patent: Nov. 2, 2004

(54) METHOD FOR GAS TURBINE LIGHT-OFF

(75) Inventor: David Dewis, Stuart, FL (US)

(73) Assignee: Elliot Energy Systems, Inc., Stuart, FL (US)

(*) Notice: Subject to any disclaimer, the term of this patent is extended or adjusted under 35 U.S.C. 154(b) by 90 days.

(21) Appl. No.: 10/229,383

(22) Filed: Aug. 27, 2002

(65) Prior Publication Data

US 2003/0056521 A1 Mar. 27, 2003

Related U.S. Application Data

(60) Provisional application No. 60/315,202, filed on Aug. 27, 2001.

(51) Int. Cl.$^7$ .................................. F02C 7/26
(52) U.S. Cl. ........................ 60/778; 60/790
(58) Field of Search ................. 60/773, 778, 786, 60/787, 788, 740

(56) References Cited

U.S. PATENT DOCUMENTS

| | | | |
|---|---|---|---|
| 3,691,759 A | * 9/1972 | Scheerer | ............... 60/786 |
| 3,844,112 A | 10/1974 | Harrison | |
| 4,341,071 A | * 7/1982 | Abo et al. | |
| 4,380,146 A | 4/1983 | Yannone et al. | |
| 5,907,949 A | 6/1999 | Falke et al. | |
| 6,035,626 A | 3/2000 | Wahl et al. | |
| 6,062,016 A | 5/2000 | Edelman | |
| 6,082,092 A | * 7/2000 | Vandervort | ............... 60/773 |
| 6,314,717 B1 | 11/2001 | Teets et al. | |

* cited by examiner

Primary Examiner—Louis J. Casaregola
(74) Attorney, Agent, or Firm—Webb Ziesenheim Logsdon Orkin & Hanson, P.C.

(57) ABSTRACT

A method for gas turbine light-off that utilizes a fixed or secondary fuel line that provides a substantially constant flow of fuel to the combustor primarily upon light-off.

17 Claims, 6 Drawing Sheets

METHOD FOR GAS TURBINE LIGHT-OFF

CROSS-REFERENCE TO RELATED APPLICATION

This application claims the benefit of U.S. Provisional Patent Application Ser. No. 60/315,202, filed Aug. 27, 2001, which is hereby incorporated by reference.

BACKGROUND OF THE INVENTION

1. Field of the Invention

This invention relates generally to the field of gas turbine engines for the generation of electricity and, more particularly, to a method for gas turbine light-off.

2. Description of the Prior Art

The starting of a gas turbine engine is a complex operation. Typically, before the gas turbine engine can run on its own power, the engine must be accelerated by an external source, such as a battery, to provide sufficient airflow to the combustor for ignition, typically referred to in the industry as light-off. In a turbogenerator having a permanent magnet motor/generator coupled to a gas turbine engine, supplying electrical power to the permanent magnet motor/generator will function as a motor to drive the gas turbine engine. Typically, engine speed varies as a function of the torque versus speed characteristics of the starter motor.

The airflow to the combustor increases generally with gas turbine engine speed. Light-off occurs when the speed of the engine produces enough combustion air to produce the correct ratio of air with the fuel supplied. Because fuel flow is highly dependent upon ambient conditions, such as ambient temperature and atmospheric pressure, the amount of fuel flow to the gas turbine engine is actively controlled as a function of the speed of the gas turbine engine in order to achieve the correct fuel-to-air ratio for light-off.

Typically, in order for the correct fuel-to-air ratio to be achieved for light-off, atmospheric pressure and ambient temperature must be accurately known or, otherwise, the representation of fuel flow will not be accurate and will not result in a combustible fuel-to-air ratio. In addition, any deviation in the measurement of gas turbine engine speed, or in the correlation of combustion air with gas turbine engine speed, can easily cause difficulties in achieving the correct fuel-to-air ratio for light-off. Therefore, in a prior art starting procedure where speed (combustion air) and fuel flow are variable, light-off is not attempted until the correct fuel-to-air ratio is thought to have been achieved, generally through experience.

In another prior art starting procedure for gas turbine engine light-off, the gas turbine engine operates at a fixed speed to provide a substantially constant supply of combustion air for light-off, while the fuel flow is variable. The fuel flow is then ramped up to achieve the correct fuel-to-air ratio, at which point light-off occurs. This fixed speed method is insensitive to fuel control variations, gas turbine engine variations, and ambient conditions.

In any starting method for a gas turbine engine, after light-off occurs, the accelerator rate of the turbine engine increases rapidly thereby increasing the air flow. The exhaust gas temperature also increases rapidly indicating that light-off has occurred.

It is, therefore, an object of the present invention to provide a consistent method for light-off of a gas turbine engine wherein fuel flow is maintained at a substantially constant rate.

SUMMARY OF THE INVENTION

The present invention provides a method for light-off of a gas turbine engine that includes the following steps. First, ambient conditions and fuel heating value is determined. The ambient conditions can include ambient temperature and atmospheric pressure. Second, the gas turbine engine is accelerated at a preset acceleration rate to a speed to provide a supply of combustion air to a combustor for light-off of the gas turbine engine. The preset acceleration rate of the gas turbine engine can be determined based upon the ambient conditions and the fuel heating value. Acceleration of the gas turbine engine can be achieved by applying electrical assistance, such as battery power or electric grid, whereby a turbine drive shaft rotates causing compressor blades and turbine blades to rotate. Third, an ignition source, such as an igniter, is activated in the combustor of the gas turbine engine based upon the ambient conditions and the speed-of-rotation of the compressor blades and the turbine blades of the gas turbine engine. Fourth, a flow of fuel can be supplied through a fuel line to the combustor at a substantially constant rate to provide an optimum supply of fuel to the combustor. The supply of fuel at this constant rate is maintained until the correct fuel-to-air ratio is achieved and light-off of the gas turbine engine occurs. Fifth, light-off of the gas turbine engine can be sensed by using a heat sensor located adjacent the turbine exhaust gases to measure exhaust gas temperature of the gas turbine engine. Sixth, electrical assistance to the gas turbine engine is eliminated based upon a fixed value of the rotational speed of the turbine blades of the gas turbine engine. This fixed value can be determined by the torque versus speed characteristics of the starter motor. Seventh, the flow of fuel to the combustor is initiated through a primary fuel line and ramped up to increase the speed of the gas turbine engine to a final speed to which a load can be applied.

At least one fuel orifice which supplies fuel to the combustor is in fluid communication with a fuel source via the fuel line. The fuel line can include both a secondary fuel line and the primary fuel line. The fuel supplied to the combustor through the secondary fuel line is primarily used for light-off in the combustor. The secondary fuel line which supplies fuel to the combustor at a substantially constant rate can include a valve, such as a solenoid valve and/or a flow orifice to fix the flow of fuel to the combustor. However, the valve without the flow orifice in the secondary fuel line can also be used to fix the flow of fuel to the combustor by opening the valve to a predetermined position. The primary fuel line which supplies fuel to the combustor at a variable rate includes a primary fuel valve, such as a control valve. Fuel is primarily supplied through the primary fuel line after light-off has occurred. However, in a situation where the combustor is idled at an idle speed, the fuel supplied through the primary fuel line can be shut off, thereby only allowing fuel to be supplied through the secondary fuel line so that the combustor is operating at idle speed without any electrical assistance to the gas turbine engine.

In a situation where light-off does not occur after a fixed period of time at the constant flow rate of fuel, the system is then stopped and purged.

A complete understanding of the invention will be obtained from the following description when taken in connection with the accompanying drawing figures wherein like reference characters identify like parts throughout.

BRIEF DESCRIPTION OF THE PREFERRED EMBODIMENTS

In a gas turbine engine, inlet air from the gas turbine compressor is continuously compressed, mixed with fuel in an inflammable proportion, and then contacted with an ignition source to ignite the mixture, which will then continue to burn. Heat energy is released causing combustion gases to flow across a turbine where it is converted to rotary energy for driving equipment, such as an electrical generator. The combustion gases are then exhausted to the atmosphere. A method for light-off of a gas turbine engine according to the present invention occurs in a combustor.

Figure 1:
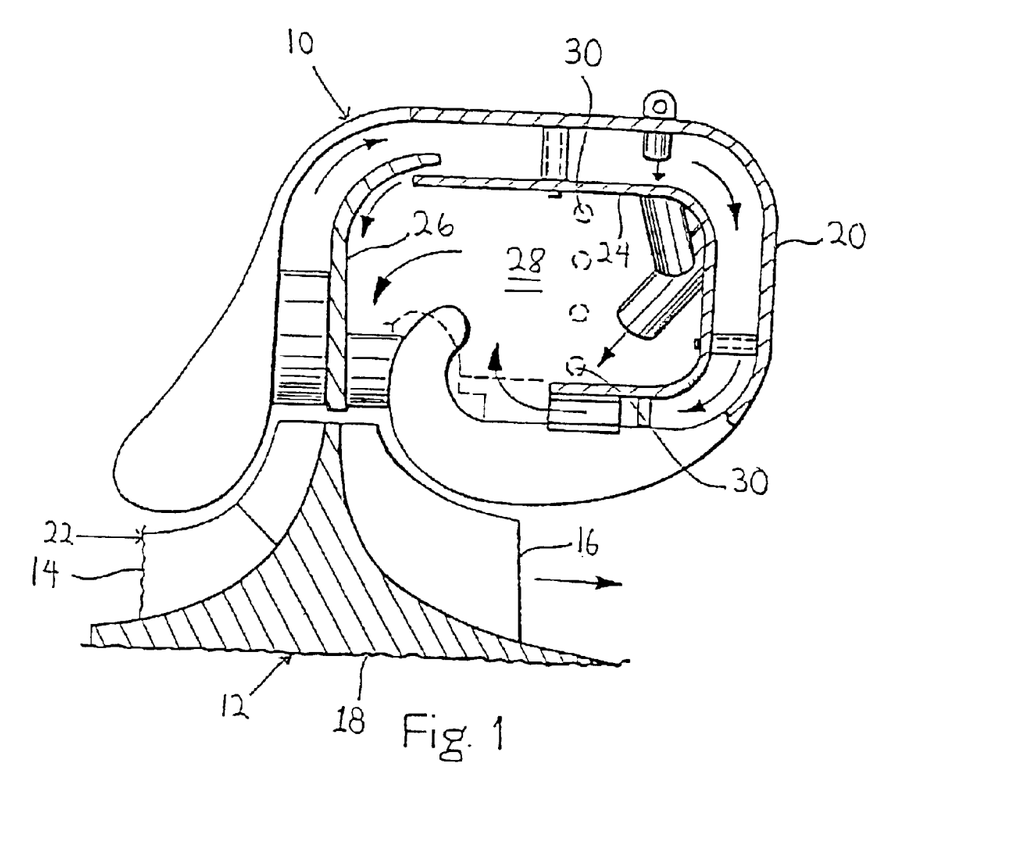
FIG. 1 is a partial-sectional view of a portion of an annular combustor.

FIG. 1 shows a partial cross section of a portion of a combustor 10 connected to a compressor/turbine arrangement 12. Arrangement 12 includes compressor blades 14 and turbine blades 16 positioned around an engine rotor or turbine drive shaft 18.

Figure 2:
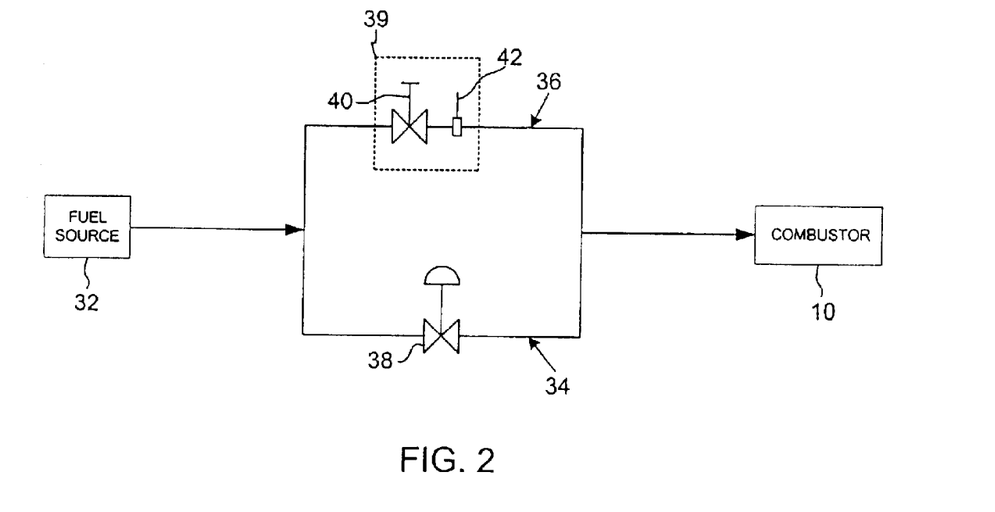
FIG. 2 is a schematic diagram of fuel flow from a fuel source to the annular combustor shown in FIG. 1.

With reference to FIGS. 1 and 2, the combustor 10 includes an annular outer housing wall 20 defining an air intake passage 22 positioned adjacent the compressor blades 14. An outer combustor liner wall 24 and an inner housing wall 26 define an annular combustion chamber 28. The combustion chamber 28 includes at least one fuel orifice 30 for supplying fuel to the combustor 10. However, a plurality of fuel orifices 30 can also be used for supplying fuel to the combustor 10. The fuel orifices 30 are in fluid communication with a fuel source 32 via a primary fuel line 34 and a secondary fuel line 36 (shown in FIG. 2). The primary fuel line 34 can include a primary fuel valve 38, such as a control valve for controlling the flow of fuel to the combustor 10. The secondary fuel line 36 primarily used for light-off of the combustor 10 can include an arrangement 39 for providing a substantially constant flow of fuel to the combustor 10. However, one fuel line can be use both to control the flow of fuel and to provide a constant flow of fuel to the combustor 10. The arrangement 39 can include a valve 40, such as a solenoid valve and/or a flow orifice 42. When the arrangement 39 only includes the valve 40, fuel is supplied to the combustor 10 at a substantially constant flow rate by opening the valve 40 to a predetermined position. When the arrangement 39 includes both the valve 40 and the flow orifice 42, the flow orifice 42 is primarily used to fix the flow of fuel to the combustor 10. However, when a control valve is used to supply fuel to the combustor 10 at a substantially constant flow rate, variations can occur in the flow rate that are inherent to control valves. For example, the signal to the controller can vary because of noise or electrical interference which can vary the opened and/or closed positions of the control valve, thereby causing variations in the flow of fuel to the combustor 10. Therefore, periodic calibration of control valves are necessary to maintain their accuracy. In contrast, the arrangement 39 which includes valve 40 and/or flow orifice 42 in the secondary fuel line 36 eliminates the deficiencies associated with the use of a control valve, thereby providing a more reliable and robust system for fixing the supply of fuel to the combustor 10 at a substantially constant flow rate.

A detailed description of the annular combustor 10 is described in PCT Publication No. WO 98/25082, which is hereby incorporated by reference.

Figure 3:
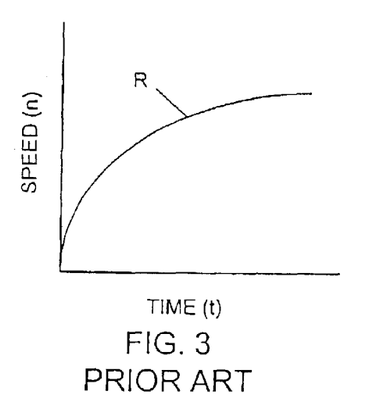
FIG. 3 is a graph of gas turbine engine speed versus time for a prior art gas turbine engine light-off method.
Figure 4:
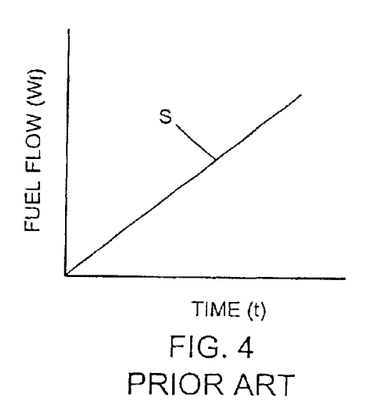
FIG. 4 is a graph of fuel flow to a gas turbine engine versus time for a prior art gas turbine engine light-off method.

FIGS. 3 and 4 graphically show a prior art gas turbine engine light-off method or starting procedure. Referring to FIG. 3, the gas turbine engine speed "n" is increased with time "t" during the starting procedure, generally along the curved line "R". At the same time, the fuel flow "Wf" is increased versus time "t" in the generally straight line "S" in FIG. 4. In the prior art, in order for the correct fuel-to-air ratio to be achieved for light-off, atmospheric pressure and temperature must be accurately known; otherwise, the representation of fuel flow "Wf" would not be accurate, thereby throwing off the fuel-to-air ratio. Likewise, any deviation in the measurement of gas turbine engine speed, or in the correlation of combustion air with gas turbine engine speed, can easily throw off achieving the correct fuel-to-air ratio for light-off. In the prior art starting procedure, both engine speed "n" and fuel flow "Wf" vary with time "t". With both the "n" and "Wf" varying, the prior art starting procedure is extremely sensitive to fuel control variations, gas turbine engine variations, sensor accuracy, and ambient conditions. For example, starting a gas turbine engine at low temperatures and high altitudes can be very troublesome in achieving the correct fuel-to-air ratio for light-off.

Figure 5:
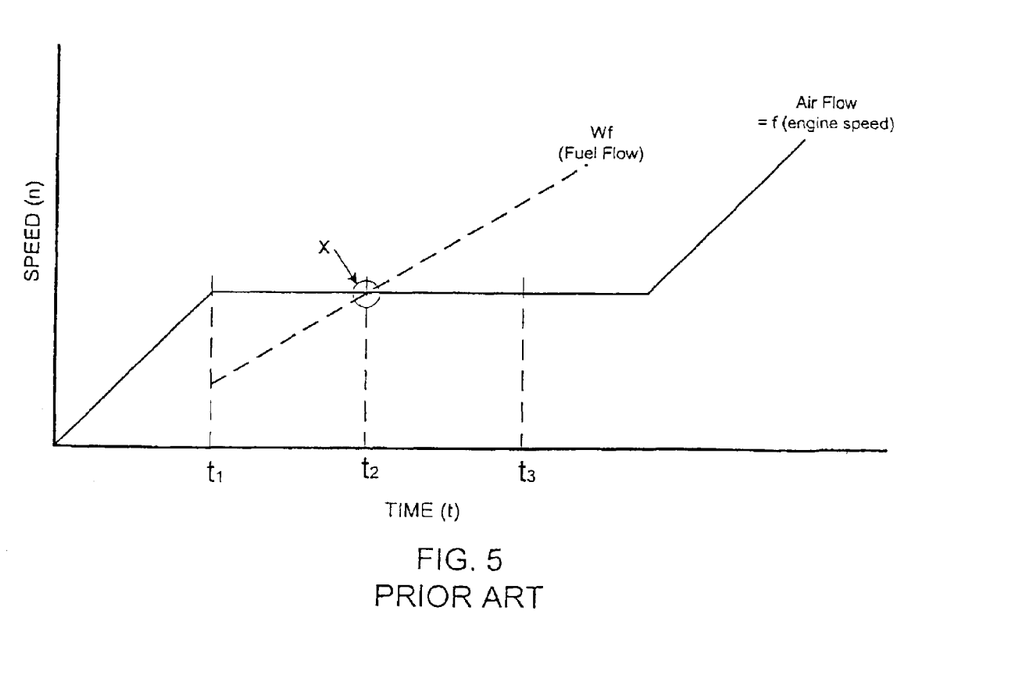
FIG. 5 is a graph showing operational speed versus time of a prior art gas turbine engine.

FIG. 5 shows a prior art gas turbine engine fixed speed light-off method shown by a graphical presentation of engine air flow "f" and fuel flow "Wf" versus time "t". In this prior art, at time "$t_1$", fuel flow is initiated as shown by dashed line "Wf". After an initial level, the fuel flow "Wf" is increased at a constant rate until it crosses line "f", which represents airflow. Where these two lines "Wf" and "f" intersect, at point "X" the correct fuel-to-air ratio for light-off is achieved, which occurs at time "$t_2$". The ignition source in the combustor is turned on at time "$t_1$" and light-off will occur at time "$t_2$". Once light-off does occur, the airflow "f" will increase as gas turbine engine speed "n" increases. At time "$t_3$" when the exhaust gas temperature rise indicates that light-off has occurred, fuel flow is then controlled as a function of acceleration or exhaust gas temperature limit. This prior art starting procedure is insensitive to fuel control variations, gas turbine engine variations, and ambient conditions.

Figure 6:
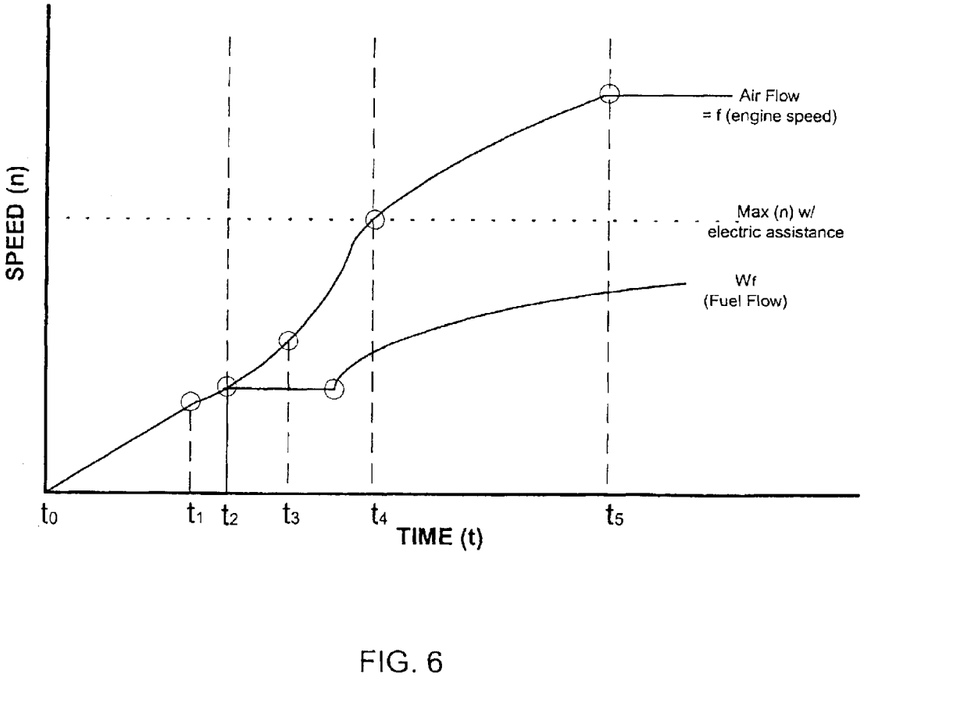
FIG. 6 is a graph of gas turbine engine speed and fuel flow versus time for a gas turbine engine light-off method according to the present invention.
Figure 7:
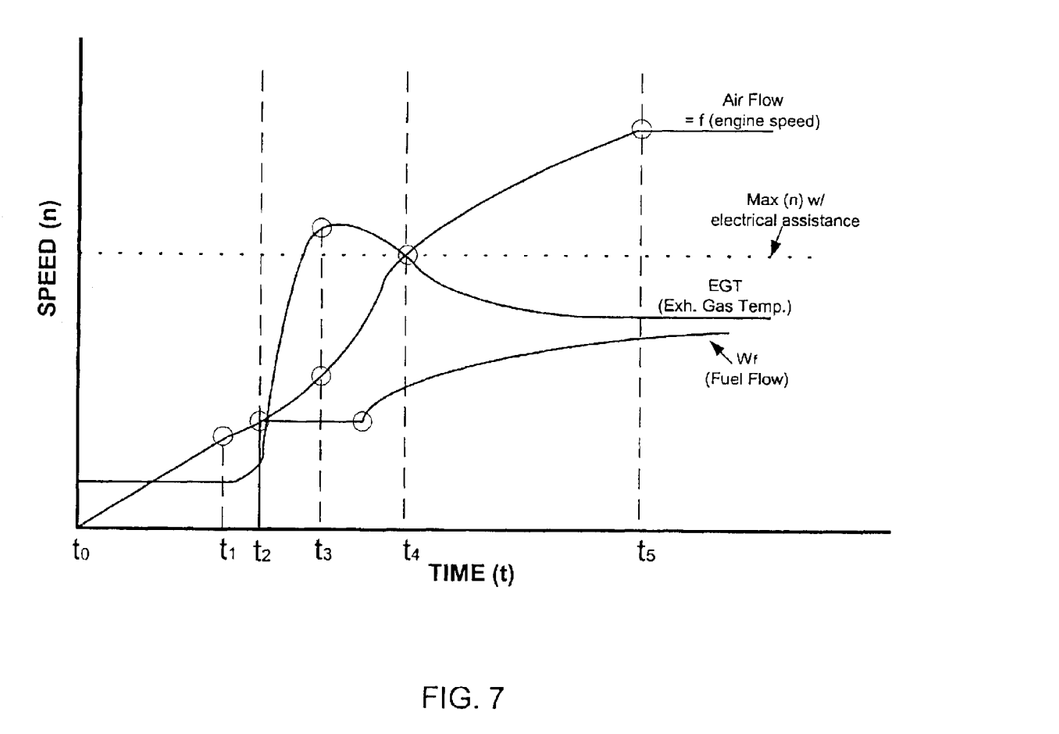
FIG. 7 shows the graph of gas turbine engine speed and fuel flow versus time for a gas turbine engine light-off method of FIG. 6, including exhaust gas temperature versus time.
Figure 8:
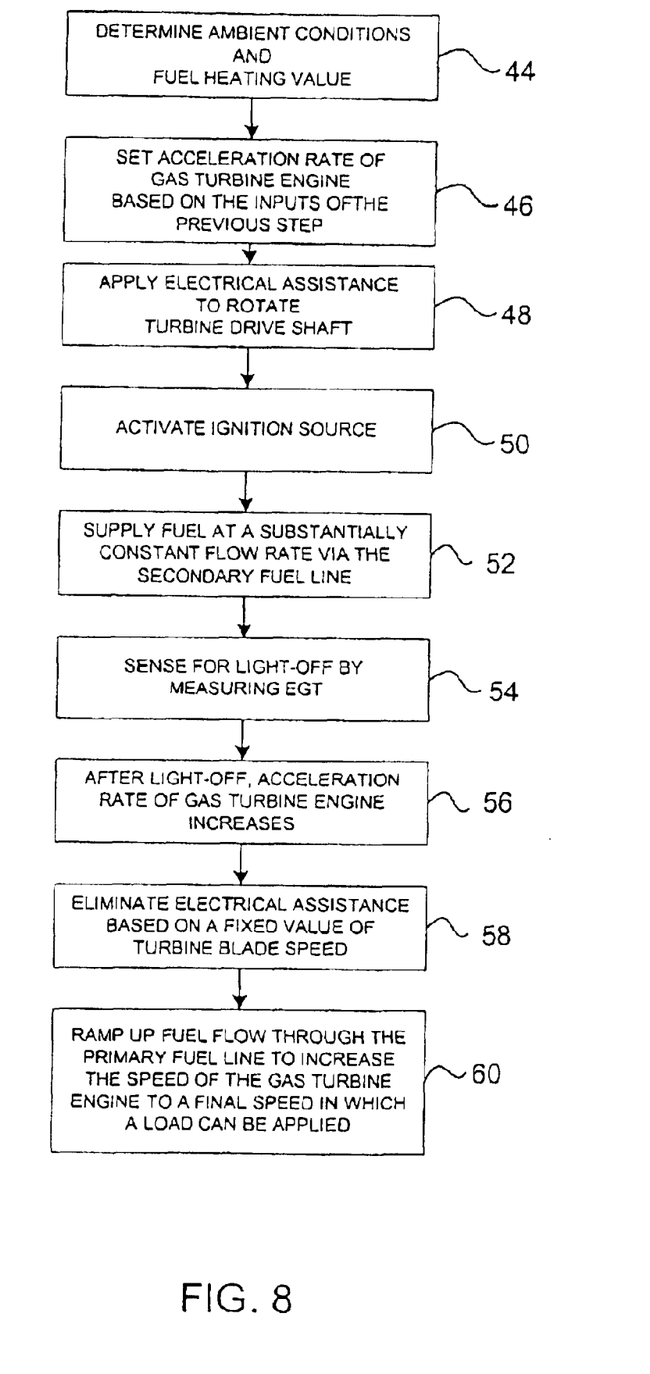
FIG. 8 is a schematic flow diagram representing the gas turbine light-off method according to the present invention.

The gas turbine light-off method according to the present invention is illustrated in FIGS. 6, 7, and 8. FIG. 6 is a graphical presentation of engine airflow "f" and fuel flow "Wf" versus time "t". FIG. 7 is a graphical presentation of engine airflow "f", fuel flow "Wf" and exhaust gas temperature "EGT" versus time "t". FIG. 8 illustrates the control logic of the gas turbine light-off method of the present invention in flow chart format and generally corresponds to FIGS. 6 and 7.

Referring to FIGS. 6, 7, and 8, at time "$t_0$" ambient conditions and fuel heating value is determined in step 44. The ambient condition includes both ambient temperature and ambient atmospheric pressure. The fuel heating value is the heat generated when 1 pound or 1 cubic foot of combustible material is completely burned, usually at a standard temperature and pressure. The fuel heating value varies with temperature and pressure. In step 46, an acceleration rate of the gas turbine engine can be set based on the input of the previous step 44. In step 48, at time "$t_0$", electrical assistance is applied to start rotation of the turbine drive shaft 18, which causes the compressor blades 14 and turbine blades 16 to rotate. This can occur through a battery supplying power to a start inverter, which can act as a motor to drive the compressor/turbine arrangement 12 via the electric power supplied thereto. Other arrangements can be provided to electrically drive the compressor/turbine arrangement 12, such as an electric motor directly coupled to the drive shaft 18 to drive the compressor/turbine arrangement 12. The motor can be driven by an outside electrical power source and/or a battery. In step 50, at time "$t_1$", an igniter is ignited based on the ambient conditions in step 44 and the rotational speed of the compressor blades 14 and turbine blades 16 in step 48. In step 52, at time "$t_2$", fuel is initially supplied to the combustor 10 at a substantially constant flow rate from the fuel source 32 via the secondary fuel line 36. In step 54, a heat sensor can be used to sense for light-off by measuring the exhaust gas temperature, as shown at time "$t_3$" in FIG. 7. When light-off occurs, there is a significant increase in the exhaust gas temperature which causes the air flow "f" to increase as the gas turbine engine speed increases, whereby the turbine blades 16 are caused to be rotated by the combination of the gases passing across the turbine blades 16 and rotation of the turbine drive shaft 18 by electrical assistance. After light-off has occurred, the acceleration rate of the gas turbine engine increases (step 56). In step 58, at time "$t_4$", electrical assistance to the gas turbine engine is eliminated based on the maximum speed or fixed speed value of the turbine blades 16, which is determined by the torque versus speed characteristics of the starter motor. The inverter then can cease to provide power to drive the compressor/turbine arrangement 12. As the gas turbine engine is driven by the products of combustion, then the percentage of power supplied by the battery to drive the compressor decreases. In other words, initially 100% of the power to drive the compressor/turbine arrangement 12 is supplied by the electrical power through the starter motor. After light-off, this percentage decreases and more percentage of power to drive the compressor/turbine arrangement 12 is supplied via the products of combustion until the electrical power is eliminated and the compressor/turbine arrangement 12 is completely driven by products of combustion and air. In step 60, after sensing ignition and before electrical assistance is eliminated (i.e., between times "$t_3$" and "$t_4$"), fuel is initiated through the primary fuel line 34 to the combustor 10 and is ramped up so as to increase the speed of the gas turbine engine to a final speed to which a load may be applied. By "ramped up" is meant a positive rate of change with respect to time.

In a situation where the combustor 10 is idle at an idle speed, then the fuel supplied through the primary fuel line 34 can be shut off, thereby only allowing fuel to be supplied through the secondary fuel line 36 at a constant flow rate so that the combustor 10 is operating at an idle speed without any electrical assistance to the compressor/turbine arrangement 12, such as shown at "$t_4$" in FIGS. 6 and 7.

In another situation where light-off does not occur after a fixed period of time at the substantially constant flow rate of fuel, the system is stopped and purged.

It will be understood by those skilled in the art that while the foregoing description sets forth in detail preferred embodiments of the present invention, modifications, additions, and changes might be made thereto without departing from the spirit and scope of the invention.

What is claimed:

1. A method for light-off of a gas turbine engine comprising:
   a. determining ambient conditions and fuel heating value;
   b. accelerating a gas turbine engine at a preset acceleration rate to a speed to provide a supply of combustion air to a combustor for light-off of said gas turbine engine, wherein said preset acceleration rate of said gas turbine engine is determined based upon said ambient conditions and said fuel heating value;
   c. activating an ignition source for said combustor of said gas turbine engine; and
   d. initiating a flow of fuel to said combustor at a substantially constant rate via a fuel line to provide an optimum supply of fuel to said combustor and maintaining said constant rate until the correct fuel-to-air ratio is achieved and light-off of said gas turbine engine occurs.

2. The method as claimed in claim 1, wherein said ambient conditions comprise ambient temperature and atmospheric pressure.

3. The method as claimed in claim 1, wherein said gas turbine engine is accelerated by applying electrical assistance.

4. A method for light-off of a gas turbine engine comprising:
   a. accelerating a gas turbine engine at a preset acceleration rate to a speed to provide a supply of combustion air to a combustor for light-off of said gas turbine engine;
   b. determining ambient conditions and fuel heating value;
   c. activating an ignition source for said combustor of said gas turbine engine, wherein said ignition source is activated based upon said ambient conditions and said speed of said gas turbine engine,
   d. initiating a flow of fuel to said combustor at a substantially constant rate via a fuel line to provide an optimum supply of fuel to said combustor and maintaining said constant rate until the correct fuel-to-air ratio is achieved and light-off of said gas turbine engine occurs.

5. The method as claimed in claim 1, further comprising sensing for light-off after step c by using a heat sensor.

6. The method as claimed in claim 1, further comprising sensing for light-off after step c by measuring exhaust gas temperature of said gas turbine engine.

7. The method as claimed in claim 1, wherein said fuel line comprises a valve for fixing the flow of fuel through said fuel line.

8. The method as claimed in claim 7, wherein said fuel line further comprises a flow orifice for fixing the flow of fuel through said fuel line.

9. The method as claimed in claim 3, further comprising eliminating said electrical assistance to said gas turbine engine based upon a fixed value of said speed of said gas turbine engine.

10. A method for light-off of a gas turbine engine comprising:
    a. accelerating a gas turbine engine at a preset acceleration rate to a speed to provide a supply of combustion air to a combustor for light-off of said gas turbine engine;
    b. activating an ignition source for said combustor of said gas turbine engine;
    c. initiating a flow of fuel to said combustor at a substantially constant rate via a secondary fuel line to provide an optimum supply of fuel to said combustor and maintaining said constant rate until the correct fuel-to-air ratio is achieved and light-off of said gas turbine engine occurs; and d. initiating a flow of fuel to said combustor via a primary fuel line after light-off has occurred, and ramping up said flow of fuel to said combustor of said gas turbine engine to increase said speed of said gas turbine engine to a final speed to which a load is applied.

11. The method as claimed in claim 10, further comprising determining ambient conditions and fuel heating value, wherein said preset acceleration rate of said gas turbine engine is determined based upon said ambient conditions and said fuel heating value.

12. The method as claimed in claim 10, wherein said gas turbine engine is accelerated by applying electrical assistance.

13. The method as claimed in claim 11, wherein said ignition source is activated based upon said ambient conditions and said speed of said gas turbine engine.

14. The method as claimed in claim 10, further comprising sensing for ignition after step c by measuring exhaust gas temperature of said gas turbine engine.

15. The method as claimed in claim 12, further comprising eliminating said electrical assistance to said gas turbine engine based upon a fixed value of said speed of said gas turbine engine.

16. The method as claimed in claim 10, wherein said primary fuel line comprises a control valve for ramping up fuel flow to said combustor of said gas turbine engine.

17. A method for light-off of a gas turbine engine comprising:

a. determining ambient conditions and fuel heating value;

b. setting an acceleration rate of a gas turbine engine based upon said ambient conditions and said fuel heating value;

c. applying electrical assistance to accelerate said gas turbine engine at said acceleration rate, whereby a turbine drive shaft rotates causing compressor blades and turbine blades to rotate;

d. activating an ignition source for a combustor of said gas turbine engine;

e. supplying a flow of fuel to said combustor of said gas turbine engine at a substantially constant rate via a secondary fuel line until light-off of said gas turbine engine occurs;

f. sensing for ignition of said gas turbine engine;

g. eliminating said electrical assistance to said gas turbine engine after ignition has occurred based upon a fixed value of a speed of said turbine blades; and i. initiating a flow of fuel to said combustor via a primary fuel line and ramping up said flow of fuel to said combustor of said gas turbine engine to increase said speed of said gas turbine engine to a final speed to which a load is applied.

* * * * *